United States Patent [19]

Boudreaux et al.

[11] Patent Number: 4,874,704

[45] Date of Patent: Oct. 17, 1989

[54] METHOD FOR INHIBITING FOOD-BORNE HUMAN PATHOGENS AND PREVENTING MICROBIAL SPOILAGE IN REFRIGERATED FOODS USING A LACTOBACILLUS

[75] Inventors: Donald P. Boudreaux; Mark A. Matrozza, both of Sarasota; Marianne F. Leverone, Bradenton, all of Fla.

[73] Assignee: Microlife Technics, Inc., Sarasota, Fla.

[21] Appl. No.: 167,556

[22] Filed: Mar. 14, 1988

Related U.S. Application Data

[63] Continuation-in-part of Ser. No. 49,852, May 15, 1987.

[51] Int. Cl.$^4$ ............................................. C12N 1/20
[52] U.S. Cl. ................................. 435/252.9; 424/93; 422/29; 426/61; 435/853
[58] Field of Search ........................................... 435/253

[56] References Cited

U.S. PATENT DOCUMENTS

| 3,677,897 | 7/1972 | Jeffreys | 435/253 |
| 3,891,773 | 6/1975 | Kline | 435/253 |
| 4,303,679 | 12/1981 | Moshe | 435/253 |
| 4,304,868 | 12/1981 | Gryczka | 435/253 |
| 4,514,424 | 4/1985 | Raccach | 426/56 |

Primary Examiner—Peter D. Rosenberg
Attorney, Agent, or Firm—Ian C. McLeod

[57] ABSTRACT

A method for inhibiting food-borne pathogen and spoilage microorganisms in processed foods using a Lactobacillus sp. which produces an antimicrobial substance at refrigeration temperatures is described. The method is particularly effective in inhibiting gas producing heterofermentative spoilage microorganisms, mold, food-borne pathogenic microorganisms, (Listeria and Salmonella) and phychrotrophic microorganisms which can occur in processed foods.

23 Claims, No Drawings

METHOD FOR INHIBITING FOOD-BORNE HUMAN PATHOGENS AND PREVENTING MICROBIAL SPOILAGE IN REFRIGERATED FOODS USING A LACTOBACILLUS

CROSS REFERENCE TO RELATED APPLICATION

This application is a continuation-in-part of application Ser. No. 049,852 filed May 15, 1987.

BACKGROUND OF THE INVENTION (1) Summary of the Invention

The present invention relates to a bacterial method for inhibiting food-borne human pathogenic microorganisms and/or for preventing microbial spoilage in refrigerated processed foods after any heating of the foods during the processing which might inactivate bacteria. In particular, the present invention relates to a method wherein selected members of the genus Lactobacillus which metabolize in the processed food to produce an antimicrobial substance are inoculated into the processed food which is then held at refrigeration temperatures in order to inhibit the microorganisms without a substantial increase of the cell count (numbers) of the added bacterium.

(2) Prior Art

U.S. Pat. No. 4,514,424 to Raccach shows the use of *Lactobacillus casei* subspecies alactosus NRRL-B-12344 in fermented foods, particularly fermented sausage. The cells metabolize and increase in cell count in the sausage formulation. The problem is that this strain was later found to produce hydrogen peroxide which produces defects in sausage referred to as the "green ring". This strain was never commercialized for a sausage fermentation. The strain has been used for cheese fermentations where the cell count of the bacterium increases significantly as lactic acid is generated. The bacterium does not occur in significant numbers in the cheese product.

OBJECTS

It is therefore an object of the present invention to provide a method for protecting refrigerated processed foods by incorporating in the processed food viable cells of a Lactobacillus which produce an antimicrobial substance to inhibit food-borne human pathogenic microorganisms and/or food spoilage microorganisms without a substantial increase in the number of cells of the Lactobacillus in the processed food. It is further an object of the present invention to provide a method which is simple and economical. These and other objects will become increasingly apparent by reference to the following description.

GENERAL DESCRIPTION

The present invention relates to a method for inhibition of spoilage or food-borne pathogen microorganisms in a refrigerated processed food which comprises: inoculating the processed food following any heat treatment of the food which would inactivate the cells with a number of cells of a Lactobacillus which remain viable during refrigerated storage and which produce an antimicrobial substance to inhibit the microorganisms, and storing the food at refrigeration temperatures which prevent the number of the added Lactobacillus cells from increasing significantly except during transient temperature abuse. Both spoilage and food-borne human pathogens are inhibited in the food. The term "spoilage" means flavor, appearance, texture and/or aroma. The pathogens may or may not produce any evidence of spoilage in the food. Preferably the inhibition is at least twice as long as a control which does not contain added Lactobacillus cells.

U.S. patent application Ser. No. 049,852 filed May 15, 1987 describes the inhibition of psychrotrophic spoilage microorganisms by a Lactobacillus, particularly Lactobacillus casei subspecies alactosus NRRL-B-12344, which produces hydrogen peroxide in raw milk before it is processed. The inhibition results in part from the lactoperoxidase system in milk using lactoperoxidase and thiocyanate naturally present. It has now been found that other antimicrobial metabolites are produced by this strain.

The preferred Lactobacillus which produce antimicrobial metabolites, including hydrogen peroxide, are *Lactobacillus casei* subspecies alactosus NRRL-B-12344 and Lactobacillus sp. NRRL-B-18,261 which have been deposited with the Northern Regional Research Laboratory in Peoria, Ill. Both strains do not ferment lactose and produce hydrogen peroxide. These strains are available upon request by name and number. Other Lactobacillus sp. which produce an antimicrobial substance at refrigeration temperatures in processed foods can be easily located by screening. All that is required is testing in the food to be treated. There are only a relatively few Lactobacillus sp. which can be used in the present invention.

The food-borne pathogens inhibited include Salmonella and Listeria. Molds, which are spoilage microorganisms, such as *Penicillium oxalicum* are inhibited. The spoilage microorganisms include *Lactobacilus fermentum* and *Lactobacillus bifermentans* and various psychrotrophic microorganisms which produce spoilage at refrigeration temperatures.

The Lactobacillus sp. which produce the antimicrobial metabolites can be provided as a bacterial concentrate which is frozen or lyophilized. The bacterial concentrates usually contain between about $10^9$ and $10^{12}$ CFU (colony forming units or cells) per ml or gram. The cultures can also be used directly from a growth medium and usually contain between $10^8$ to $10^9$ CFU per ml.

A "processed food" is one which has been subjected to some form of treatment prior to being consumed. The processed food is particularly hard or soft cheeses, pasteurized milk or cream based products, dressing, sauces and the like. The culture is introduced after any heat treatment or pasteurization of the food to prevent the culture from being inactivated or killed during the processing.

The Lactobacillus can be used at a rate of between about $10^2$ to $10^8$ CFU per gram of processed food. For hard or soft cheeses the amount is preferably between about $10^5$ and $10^8$ CFU per ml or gram.

The processed foods are stored at refrigeration temperatures, which are less than about 12° C. and preferably between 1° C. and 12° C., after inoculation with the Lactobacillus. The foods are not fermented during storage. The cells do not divide (grow) significantly and thus do not ferment the processed food after introduction. Thus the cell count of the added Lactobacillus sp. does not increase significantly (i.e. by more than about ten times) during refrigeration. There can be temporary temperature abuse of the processed food during storage and it is still regarded as a "refrigerated" processed food because of the general conditions of storage. If the temperature abuse is severe, then the Lactobacillus can produce lactic acid and the food would be regarded as spoiled.

SPECIFIC DESCRIPTION

EXAMPLE 1

This Example shows the use of *Lactobacillus casei* subspecies alactosus NRRL-B-12344 for inhibition of gas producing heterofermentative Lactobacilli.

PROCEDURE

A model food system which supports carbon dioxide production by heterofermentative lactobacilli was developed. The substrate contained 1% casein hydrolysate, 1% beef extract, 0.5% yeast extract, 2% dextrose and 0.75% agar. The substrate was distributed into screw cap tubes, autoclaved (121° C./15 min.) and tempered to 45° C. The tubes were inoculated with *Lactobacillus casei* subspecies alactosus NRRL-B-12344 and/or a heterofermentative indicator strain (*Lactobacillus fermentum*). The tubes were allowed to solidify at 24° C. and then a 3 ml plug of sterile 2% agar (45° C.) was delivered to the substrate surface of each tube. The tubes were incubated at 24° C. Gas production was indicated by cracking of the medium and displacement of the agar plug. As can be seen from Table 1, *Lactobacillus casei* subspecies alactosus NRRL-B-12344 effectively inhibited the production of gas by *Lactobacillus fermentum* at 24° C. for a relatively long period of time even when *L. fermentum* was added at very high levels ($5 \times 10^8$/gram) which normally would not be encountered in foods processed under sanitary conditions.

TABLE 1

| Incubation Time (h) | L. fermentum[1] Added (CFU/ml) | L. casei[2] Added (CFU/ml) | Gas[3] Production |
|---|---|---|---|
| 24 | $1 \times 10^7$ | — | — |
|  | $1 \times 10^7$ | $4 \times 10^7$ | — |
|  | $5 \times 10^7$ | — | — |
|  | $5 \times 10^7$ | $4 \times 10^7$ | — |
|  | $50 \times 10^7$ | — | + |
|  | $50 \times 10^7$ | $4 \times 10^7$ | — |
| 48 | $1 \times 10^7$ | — | + |
|  | $1 \times 10^7$ | $4 \times 10^7$ | — |
|  | $5 \times 10^7$ | — | + |
|  | $5 \times 10^7$ | $4 \times 10^7$ | — |
|  | $50 \times 10^7$ | — | + |
|  | $50 \times 10^7$ | $4 \times 10^7$ | — |
| 120 | $1 \times 10^7$ | — | + |
|  | $1 \times 10^7$ | $4 \times 10^7$ | — |
|  | $5 \times 10^7$ | — | + |
|  | $5 \times 10^7$ | $4 \times 10^7$ | — |
|  | $50 \times 10^7$ | — | + |
|  | $50 \times 10^7$ | $4 \times 10^7$ | + |

[1] *Lactobacillus fermentum* is a heterofermentative Lactobacillus.
[2] *Lactobacillus casei* subspecies *alactosus* NRRL-B-12344.
[3] Gas production in the model food system consisting of 1% casein hydrolysate, 1% beef extract, 0.5% yeast extract, 2% dextrose, 0.75% agar. +, Gas produced; —, No gas produced.

This example shows that even at 24° C. which can occur during temporary temperature abuse of the food during storage, *Lactobacillus fermentum* is inhibited. During refrigerated storage, the inhibition was for much longer periods.

The results of Example 1 show that the shelf life of product containing *Lactobacillus casei* subspecies alactosus NRRL-B-12344 is at least twice as long as the control without the cells, even at 24° C. The generation of gas is prevented as evidenced by the lack of cracking and movement of the agar plug when the *Lactobacillus casei* subspecies alactosus is present.

Processed foods containing *Lactobacillus casei* can be provided in sealed packages, such as blister packs. The generation of gas, primarily carbon dioxide, by heterofermentative spoilage microorganisms, particularly *Lactobacillus fermentum* and *Lactobacillus bifermentans* is prevented. The Lactobacillus prevents spoilage of the processed food, cracking of the food and rupture of the sealed package by gas produced by the spoilage bacteria.

EXAMPLE 2

This Example shows the use of *Lactobacillus casei* subsp. alactosus NRRL-B-12344 for inhibition of psychrotrophic microorganisms in a cream dressing.

PROCEDURE

A model cream dressing system was prepared using a half cream and half milk base. Commercial half and half was obtained and the pH was adjusted to 5.0 with 85% lactic acid. Sodium chloride was added to a concentration of 1.5%. The dressing was inoculated with psychrotrophic microorganisms for an initial titer of $4.0 \times 10^5$ cfu/ml. This inoculum was obtained from a commercial milk sample and represents heavy contamination. The dressing was placed in sterile bottles and inoculated with *Lactobacillus casei* subspecies alactosus NRRL-B-12344. A control consisted of the dressing without inoculation with the *Lactobacillus casei* subspecies alactosus. The samples were incubated at 7° C. The psychrotroph count (CVT count) was conducted as described by Gilliland et al (Psychrotrophic microorganisms in *Compendium of Methods for the Microbiological Examination of Foods*. American Public Health Association, Marvin L. Speck, ed. 173–178 (1976)) after 3, 6, 10, 22 and 28 days incubation at 7° C. The results are shown in Table 2.

TABLE 2

| Psychrotrophic Cell Count[2] (CFU $\times 10^6$/ml) | | |
|---|---|---|
| Days at 7° C. | Control | Lactobacillus casei subspecies alactosus[1] NRRL-B-12344 |
| 0 | 0.42 | 0.42 |
| 3 | 0.23 | 0.01 |
| 6 | 6.30 | 2.30 |
| 10 | 131.00 | 13.20 |
| 22 | 2060.00 | 620.00 |
| 28 | 4400.00 | 1510.00 |

[1] *Lactobacillus casei* subspecies *alactosus* (NRRL-B-12344) at $1 \times 10^7$ cfu/ml dressing.
[2] Gram negative psychrotrophic organisms enumerated on Crystal Violet Tetrazolium (CVT) Agar.

As seen in Table 2, *Lactobacillus casei* subspecies alactosus NRRL-B-12344 significantly inhibited psychrotrophic microorganism development in the cream dressing system at 7° C. by comparison to the control.

EXAMPLE 3

This Example shows the preservation of a dressing using a plate assay for the inhibition of psychrotrophic bacteria.

PROCEDURE

A cream dressing agar medium was prepared using 200 ml of ultra-pasteurized half and half. Sodium chloride and bacteriological agar were added at 1.5% each, and the medium was heated to boiling to dissolve the agar. After tempering to 45° C., the medium was acidified to pH 5.0 by adding 1.8 ml 85% lactic acid.

The cream dressing agar was then divided into 2×100 ml portions in sterile flasks and inoculated with the following cultures:
(A) Control—no culture
(B) *Lactobacillus casei* subsp. alactosus NRRL-B-12344 @ 8.9×10⁶ CFU/ml.

The flasks were mixed well and 2 petri plates poured per flask and allowed to solidify. All plates were surface inoculated with 0.1 ml of a dilution prepared from a frozen stock of psychrotrophic milk spoilage microorganisms obtained from commercial pasteurized milk. The psychrotrophic microorganisms were diluted to deliver approximately 1500 cells per plate, which is heavy contamination.

One set of plates was incubated @ 24° C. and the duplicate set was incubated @ 5° C. The plates were monitored daily for surface growth of psychrotrophs. The temperature of 24° C. can occur temporarily for short periods of time, as previously indicated, during storage of the processed food.

TABLE 3

| | Degree of Psychrotroph Growth[1] | |
|---|---|---|
| Days @ 24° C. | Uninoc. Control | *L. casei*[2] |
| 2 | 2+ | 0+ |
| 4 | 4+ | 2+ |
| 8 | 4+ | 3+ |

[1]Psychrotroph growth visually scored from 0+ (no growth) to 4+ (confluent lawn).
[2]*Lactobacillus casei* subsp. *alactosus* (NRRL-B-12344) at 8.9 25 × 10⁶ CFU/ml.

TABLE 4

| | Degree of Psychrotroph Growth[1] | |
|---|---|---|
| Days @ 5° C. | Uninoc. Control | *L. casei*[2] |
| 4 | 0+ | 0+ |
| 8 | 3+ | 1+ |

[1]Psychrotroph growth visually scored from 0+ (no growth) to 4+ (confluent lawn).
[2]*L. casei* subsp. *alactosus* NRRL-B-12344 at 8.9 × 10⁶ 35 CFU/ml.

As can be seen from Tables 3 and 4, *Lactobacillus casei* subspecies alactosus NRRL-B-12344 provided inhibition of the psychrotrophic microorganisms particularly at 5° C. and 24° C. for up to 8 days.

EXAMPLE 4

This Example shows use of *Lactobacillus casei* subsp. alactosus NRRL-B-12344 for inhibition of mold in a processed food.

PROCEDURE

A basic cream dressing agar was prepared using 200 ml of ultra-pasteurized half and half. Sodium chloride and bacteriological agar were added at 1.5% each, and the medium was heated to boiling to dissolve the agar. After tempering to 45° C., the medium was acidified to pH 5.0 by adding 1.8 ml 85% lactic acid.

The cream dressing agar was then divided into 2×100 ml portions in sterile flasks and inoculated as follows:
(A) Control—no culture
(B) *Lactobacillus casei* subsp. alactosus NRRL-B-12344 @ 1×10⁷ CFU/ml.

The flasks were mixed well and 2 petri plates poured per flask and allowed to solidify. A *Penicillium oxalicum* spore suspension was spread on the surface of each plate to deliver approximately 50 spores per plate. This represents substantial contamination.

One set of plates was incubated @ 24° C. and the duplicate set was incubated @ 7° C. The temperature of 24° C. can occur for short periods as a result of temperature abuse of the processed food as previously indicated. The plates were monitored daily for surface growth of mold. The results are shown in Tables 5 and 6.

TABLE 5

| | Degree of Mold Growth[1] | |
|---|---|---|
| Days @ 24° C. | Uninoc. Control | *Lactobacillus casei* subspecies *alactosus* NRRL-B-12344 |
| 1 | 0+ | 0+ |
| 3 | 2+ | 1+ |
| 4 | 4+ | 1+ |
| 10 | 4+ | 3+ |

[1]Mold growth scored visually from 0+ (no growth) to 4+ (confluent lawn).

TABLE 6

| | Degree of Mold Growth[1] | |
|---|---|---|
| Days @ 7° C. | Uninoc. Control | *Lactobacillus casei* subspecies *alactosus* NRRL-B-12344 |
| 4 | 0+ | 0+ |
| 10 | 3+ | 0+ |
| 13 | 3+ | 0+ |
| 18 | 4+ | 0+ |

[1]Mold growth scored visually from 0+ (no growth) to 4+ (confluent lawn).

The results of Example 4 show that mold inhibition was particularly effective at 7° C. Even at 24° C. the mold inhibition was good.

EXAMPLE 5

This example shows use of Lactobacillus sp. NRRL-B-18261 for inhibition of psychrotrophic microorganisms in a cream dressing.

PROCEDURE

A model cream dressing system was prepared using a half cream and half milk base. Commercial half and half was obtained and the pH was adjusted to 5.0 with 85% lactic acid. Sodium chloride was added to a concentration of 1.5%. The dressing was inoculated with psychrotrophic microorganisms for an initial titer of 5.0×10³ CFU/ml. This inoculum was obtained from a commercial milk sample and represents heavy contamination. The dressing was placed in sterile bottles and inoculated with Lactobacillus sp. NRRL-B-18261. A control consisted of the dressing without inoculation with the lactic-acid bacteria. The samples were incubated at 5° C. The psychrotroph count (CVT count) was conducted as described by Gilliland et al (Psychrotrophic microorganisms in *Compendium of Methods for the Microbiological Examination of Foods*. American Public Health Association, Marvin L. Speck, ed. 173–178 (1976)) after 4, 8, 15 and 22 days incubation at 5° C. The results are shown in Table 7.

TABLE 7

| Psychrotroph Inhibition in a Cream Dressing Using Lactobacillus sp. NRRL-B-18261 at 5° C. | | |
|---|---|---|
| | Psychrotroph Count[1] (CFU × 10⁴/ml) | |
| Days at 5° C. | Control | Test[2] |
| 0 | 0.20 | — |
| 4 | 0.64 | <0.01 |
| 8 | 60.00 | <0.01 |
| 15 | 11000.00 | 2.33 |

TABLE 7-continued

Psychrotroph Inhibition in a Cream Dressing
Using Lactobacillus sp. NRRL-B-18261 at 5° C.

| Days at 5° C. | Psychrotroph Count[1] (CFU × 10⁴/ml) | |
|---|---|---|
| | Control | Test[2] |
| 22 | 20500.00 | 17.30 |

[1]Psychrotrophic count determined on Crystal Violet Tetrazolium Agar (CVT) as described by Gilliland.
[2]Lactobacillus sp. NRRL-B-18261 added at a rate of 1 × 10⁷ CFU/ml.

Table 7 shows that Lactobacillus sp NRRL-B-18261 was very effective in inhibiting psychrotrophic microorganisms at 5° C.

EXAMPLE 6

This example shows inhibition of growth of *Salmonella newport* in a model food system at 7° C. and 24° C. by two strains of Lactobacillus.

A model food system comprised of 1.5% casein hydrolysate, 0.75% yeast extract, 0.5% soy protein hydrolysate, 0.5% salt, 0.25% dextrose, 2% 3-(N-Morpholino)propane sulfonic acid (MOPS, a buffer) and 1.5% agar was developed. The medium was adjusted to pH 6.5, sterilized at 121° C. for 15 minutes and cooled to 45° C. Test cultures were added to a portion of this medium to give a Lactobacillus count of $1 \times 10^7$ CFU/ml medium. The medium was poured into sterile petri dishes and allowed to harden. The control consisted of the test medium to which no Lactobacillus was added.

Each test plate was challenged with $2 \times 10^6$ CFU of *Salmonella newport* which is an excessively high level of contamination. The plates were incubated at 7° C. or 24° C. and scored for surface growth of *Salmonella newport*. Plates from each set (control or Lactobacillus inoculated) not challenged with *Salmonella newport* were also incubated at the appropriate temperature. These plates were used to monitor the pH of the medium during incubation. The results are shown in Table 8.

TABLE 8

Inhibition of Growth of *Salmonella newport* in a model food system containing inhibitory Lactobacillus cultures.[1]

| | Extent of Growth of *Salmonella newport* [2] | | | | | |
|---|---|---|---|---|---|---|
| | at 7° C. | | | at 24° C. | | |
| Days of Incubation | Control No Culture | LT[3] | LS[4] | Control No Culture | LT[3] | LS[4] |
| 3 | 0+ (6.52)[5] | 0+ (6.48) | 0+ (6.48) | 4+ (6.52) | 0+ (5.98) | Trace (6.28) |
| 4 | 0+ | 0+ | 0+ | 4+ (6.50) | Trace (6.00) | Trace (6.12) |
| 6 | 0+ | 0+ | 0+ | 4+ | 1+ | Trace |
| 7 | 0+ | 0+ | 0+ | 4+ | 1+ | Trace |
| 11 | 0+ | 0+ | 0+ | 4+ | 1+ | Trace |
| 14 | Trace | 0+ | 0+ | 4+ | 1+ | Trace |
| 20 | 4+ (6.48) | Trace (6.13) | Trace (6.28) | 4+ (6.39) | 1+ (5.90) | Trace (5.90) |
| 25 | 4+ | Trace | ND | (6.48) | (6.13) | (6.29) |

ND = Not determined
[1]Test media comprised of 1.5% casein hydrolysate, 0.75% yeast extract, 0.5% soy protein hydrolysate, 0.5% sodium chloride, 0.25% dextrose, 2% 3-(N—Morpholino) propane sulfonic acid (MOPS, a buffer) and 1.5% agar. The pH was adjusted to 6.5 and the medium sterilized at 250° F./15 min.
[2]*Salmonella newport* was spread onto the surface of the agar medium. The inoculation rate was 2 × 10⁶ CFU/plate. Surface growth visually scored as 4+ = confluent lawn; 0+ = No visible growth; Trace = barely visible pinpoint colonies.
[3]LT = *Lactobacillus casei* subspecies *alactosus* NRRL-B-12344. Culture was added to medium at 1 × 10⁷ CFU/ml.
[4]LS = Lactobacillus sp. NRRL-B-18261. Culture was added to medium at 1 × 10⁷ CFU/ml.
[5]pH of control plate incubated at indicated temperature but without Listeria inoculation are set forth in parenthesis.

Both strains of Lactobacillus tested effectively inhibited the growth of *Salmonella newport* at both 7° C. and 24° C. In no case did the pH of the medium drop below 5.9, thus the growth inhibition was not due to acid production.

EXAMPLE 7

Inhibition of growth of *Listeria monocytogenes* in a model food system at 7° C. and 24° C. by two strains of Lactobacillus.

A model food system comprised of 1.5% casein hydrolysate, 0.75% yeast extract, 0.5% soy protein hydrolysate, 0.5% salt, 0.25% dextrose, 2% 3-(N-Morpholino)propane sulfonic acid (MOPS, a buffer) and 1.5% agar was developed. The medium was adjusted to pH 6.5, sterilized at 121° C. for 15 minutes and cooled to 45° C. Test cultures were added to a portion of this medium to give a Lactobacillus count of $1 \times 10^7$ CFU/ml medium. The medium was poured into sterile petri dishes and allowed to harden. The control consisted of the test medium to which no Lactobacillus was added.

Each test plate was challenged with $2 \times 10^5$ CFU of *Listeria monocytogenes*. The plates were incubated at 7° C. or 24° C. and scored for surface growth of *Listeria monocytogenes*. Plates from each set (control or Latobacillus inoculated) not challenged with *Listeria monocytogenes* were also incubated at the appropriate temperature. These plates were used to monitor the pH of the medium during incubation as in Example 6. The results are shown in Table 9.

TABLE 9

Inhibition of Growth of *Listeria monocytogenes* in a model food system containing inhibitory Lactobacillus cultures.[1]

| | Extent of Growth of *Listeria monocytogenes*[2] | | | | | |
|---|---|---|---|---|---|---|
| | at 7° C. | | | at 24° C. | | |
| Days of Incubation | Control No Culture | LT[3] | LS[4] | Control No Culture | LT | LS |
| 3 | 0+ (6.52)[5] | 0+ (6.48) | 0+ (6.48) | 4+ (6.52) | 0+ (5.98) | 0+ (6.28) |
| 4 | 0+ | 0+ | 0+ | 4+ | Trace | ND |
| 6 | 0+ | 0+ | 0+ | 4+ (6.45) | 2+ (6.01) | ND |
| 7 | 0+ | 0+ | 0+ | 4+ | 2+ | ND |
| 11 | 2+ | Trace | 0+ | 4+ | 3+ | ND |
| 14 | 4+ | Trace | 0+ | 4+ | 3+ | ND |

TABLE 9-continued

Inhibition of Growth of *Listeria monocytogenes* in a model food system containing inhibitory Lactobacillus cultures.[1]

| | Extent of Growth of *Listeria monocytogenes*[2] | | | | | |
|---|---|---|---|---|---|---|
| | at 7° C. | | | at 24° C. | | |
| Days of Incubation | Control No Culture | LT[3] | LS[4] | Control No Culture | LT | LS |
| 20 | 4+ (6.48) | Trace (6.13) | 0+ (6.28) | 4+ (6.39) | 3+ (5.90) | ND |
| 25 | 4+ (6.48) | Trace (6.18) | 0+ (6.29) | | | ND |

ND = Not determined
[1]Test media comprised of 1.5% casein hydrolysate, 0.75% yeast extract, 0.5% soy protein hydrolysate, 0.5% sodium chloride, 0.25% dextrose, 2% 3-(N—Morpholino) propane sulfonic acid (MOPS, a buffer) and 1.5% agar. The pH was adjusted to 6.5 and the medium sterilized at 250° F./15 min.
[2]*Listeria monocytogenes* was spread onto the surface of the agar medium. The inoculation rate was 2 × 10⁵ CFU/plate. Surface growth visually scored as 4+ = confluent lawn; 0+ = No visible growth; Trace = barely visible pin-point colonies.
[3]LT = *Lactobacillus casei* subspecies *alactosus* NRRL-B-12344. Culture was added to medium at 1 × 10⁷ CFU/ml.
[4]LS = Lactobacillus sp. NRRL-B-18261. Culture was added to medium at 1 × 10⁷ CFU/ml.
[5]pH of control plate incubated at indicated temperature but without Listeria inoculation indicated in parenthesis.

Both strains of Lactobacillus tested effectively inhibited the growth of *Listeria monocytogenes* at both 7° C. and 24° C. In no case did the pH of the medium drop below 5.9, thus the growth inhibition was not due to acid production.

The agar plate tests wherein the spoilage or food-borne pathogenic microorganisms are provided on nutrient medium in agar containing the Lactobacillus sp., are preferred for determining whether or not a particular Lactobacillus sp. will be effective in the method of the present invention by generating an antimicrobial substance. These tests also reliably predict the affect of the Lactobacillus sp. in a particular food where the food is used as the nutrient medium in the agar.

Thus the method of the present invention can be used with salads, sauces, cheeses, salad dressings and other foods which are subject to microbial spoilage and capable of harboring human pathogens. The method can be particularly used with food which are in sealed packages where gas production breaks the seal of the package and foods (cheeses) which are cracked by the gas production.

It is intended that the foregoing description be only illustrative of the present invention and that the present invention be limited only by the hereinafter appended claims.

We claim:

1. A method for inhibition of food-borne human pathogen or spoilage microorganisms in a refrigerated processed food which has been subjected to a treatment and then packaged prior to consumption which comprises:
    (a) inoculating the processed food following any heat treatment of the food which would inactivate the cells with a number of cells of a Lactobacillus which remain viable during refrigerated storage without fermentation of the food by the Lactobacillus and which cells produce hydrogen peroxide during the refrigerated storage to inhibit the microorganisms; and
    (b) storing the food in the package at refrigeration temperatures which prevent the number of the cells from increasing significantly except during transient temperature abuse to thereby inhibit the microorganisms.

2. The method of claim 1 wherein the Lactobacillus is selected from the group consisting of *Lactobacillus casei* subspecies alactosus NRRL-B-12344 and Lactobacillus sp. NRRL-B-18261.

3. The method of claim 1 wherein the Lactobacillus is Lactobacillus sp. NRRL-B-18261.

4. The method of claim 1 wherein the refrigeration temperatures are between about 1° C. and 12° C.

5. A method for inhibition of food-borne pathogen or spoilage microorganisms in a refrigerated processed food which has been subjected to a treatment and then packaged prior to consumption which comprises:
    (a) inoculating the processed food following any heat treatment which would inactivate the cells with a number of cells of a Lactobacillus which remains viable during refrigerated storage and which cells produce hydrogen peroxide during the refrigerated storage to inhibit the microorganisms; and
    (b) storing the food in the package at refrigeration temperatures which prevent the number of the added Lactobacillus cells from increasing significantly except during transient temperature abuse, wherein the spoilage microorganisms are inhibited without fermenting the food for at least twice as long as a control without the cells.

6. The method of claim 5 wherein the Lactobacillus is selected from the group consisting of *Lactobacillus casei* subspecies alactosus NRRL-B-12344 and Lactobacillus sp. NRRL-B-18261.

7. The method of claim 5 wherein the spoilage microorganisms comprise heterofermentative lactobacilli.

8. The method of claim 7 wherein the heterofermentative spoilage microorganisms are selected from the group consisting of *Lactobacillus fermentum* or *Lactobacillus bifermentans*.

9. The method of claim 5 wherein the food is selected from the group consisting of hard or soft cheeses.

10. The method of claim 5 wherein the food is or contains sauce.

11. The method of claim 5 wherein the food is a salad dressing.

12. The method of claim 5 wherein the food contains milk or a milk derivative.

13. The method of claim 5 wherein the food is a prepared salad.

14. The method of claim 5 wherein the food is or contains meat.

15. The method of claim 5 wherein the food is or contains cheese.

16. The method of claim 5 wherein the food is or contains Cottage cheese.

17. The method of claim 5 wherein the food is stored at a temperature of between about 1° and 12° C.

18. The method of claim 5 wherein the food is provided in a sealed package.

19. The method of claim 1 wherein the food is inoculated with between about 10² and 10⁸ cells of the Lactobacillus per gram of the food.

20. The method of claim 5 wherein the food is a cheese which can be cracked by gas production by the microorganisms.

21. The method of claim 1 wherein the Lactobacillus is selected from the group consisting of *Lactobacillus casei* subspecies alactosus NRRL-B-12344 and Lactobacillus sp. NRRL-B-18261 and wherein the food is inoculated with between about 10² and 10⁸ cells of the Lactobacillus per gram of the food.

22. The method of claim 21 wherein the temperature is less than about 12° C.

23. The method of claim 17 wherein the temperature is between about 1° C. and 12° C.

* * * * *